United States Patent
Hu et al.

(10) Patent No.: US 11,982,629 B2
(45) Date of Patent: May 14, 2024

(54) DEVICE FOR RECOGNIZING DEFECTS IN FINISHED SURFACE OF PRODUCT

(71) Applicant: Fu Tai Hua Industry (Shenzhen) Co., Ltd., Shenzhen (CN)

(72) Inventors: Liu-Bin Hu, Shenzhen (CN); Wei Yang, Shenzhen (CN)

(73) Assignee: Fu Tai Hua Industry (Shenzhen) Co., Ltd., Shenzhen (CN)

( * ) Notice: Subject to any disclaimer, the term of this patent is extended or adjusted under 35 U.S.C. 154(b) by 385 days.

(21) Appl. No.: 17/540,451

(22) Filed: Dec. 2, 2021

(65) Prior Publication Data
US 2022/0373474 A1    Nov. 24, 2022

(30) Foreign Application Priority Data

May 19, 2021    (CN) .......................... 202121073967.4

(51) Int. Cl.
*G01N 21/88*    (2006.01)
*G06T 7/00*    (2017.01)

(52) U.S. Cl.
CPC ....... *G01N 21/8851* (2013.01); *G06T 7/0004* (2013.01); *G01N 2021/8887* (2013.01); *G06T 2207/20081* (2013.01)

(58) Field of Classification Search
CPC ........ G01N 21/8851; G01N 2021/8887; G06T 7/0004; G06T 2207/20081
See application file for complete search history.

(56) References Cited

U.S. PATENT DOCUMENTS

| | | | |
|---|---|---|---|
| 10,739,273 B2 * | 8/2020 | Motowaki .......... | G01B 11/0616 |
| 11,796,483 B2 * | 10/2023 | Hu .................... | G01N 21/8806 |
| 2021/0080399 A1 * | 3/2021 | Hatahori ............ | G01N 21/8806 |
| 2022/0084183 A1 * | 3/2022 | Sakuyama .............. | G06T 7/001 |

* cited by examiner

*Primary Examiner* — Hung V Nguyen
(74) *Attorney, Agent, or Firm* — ScienBiziP, P.C.

(57) ABSTRACT

A device to detect and analyze defects in a finished surface includes a supporting mechanism, a transmitting mechanism, a detecting mechanism, and a processor. The transmitting mechanism carries and transmits the product. The detecting mechanism includes a detecting frame, a light source assembly. The processor is used to connect to a first camera module and a second camera module, and preprocess the first image and the second image to obtain a detection and analysis of any defects of the front of the product.

19 Claims, 7 Drawing Sheets

_US 11,982,629 B2_

DEVICE FOR RECOGNIZING DEFECTS IN FINISHED SURFACE OF PRODUCT

TECHNICAL FIELD

The present disclosure relates to manufacturing.

BACKGROUND

Aluminum alloy in particular is used as the base material of electronic products because of characteristics such as malleability, easy processing, light weight, and slow rate of corrosion. During the processing, manufacturing and transportation of products, grinding marks, edge collapse, collision marks, scratches, and other defects, even air flow marks, can appear on the surface.

When inspecting the product surface, human eye observation may be used to judge whether there are defects on the product surface and what types of defects. Such manual detection has high labor cost and low efficiency.

Therefore, improvement is desired.

DETAILED DESCRIPTION

Figure 1:
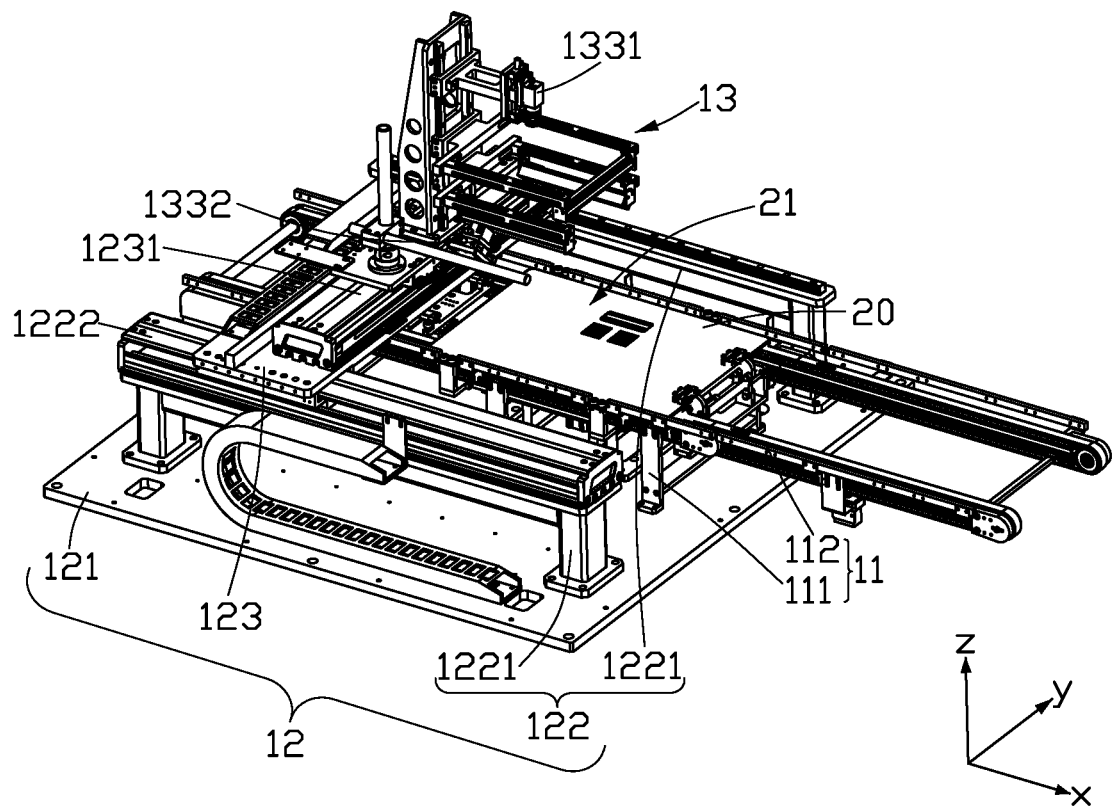
FIG. 1 is a schematic diagram of a detecting device according to an embodiment of the present disclosure.

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

In the description of the present disclosure, it should be understood that the azimuth or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise" and "counterclockwise", is based on the azimuth or positional relationship shown in the attached drawings, which are only for the convenience of describing the present disclosure and simplifying the description, rather than indicating or implying that the device or element must have a specific orientation, be constructed and operated in a specific orientation, so it cannot be understood as a limitation of the present disclosure.

The terms "first" and "second" are only used for descriptive purposes and cannot be understood as indicating or implying relative importance or implicitly indicating the number of indicated technical features. Thus, the features defining "first" and "second" may explicitly or implicitly include one or more of the features. In the description of the present disclosure, "multiple" means two or more, unless otherwise expressly and specifically defined.

In the description of the present disclosure, it should be noted that, unless otherwise clearly specified and limited, the terms "install", "connect" and "connection" should be understood in a broad sense, for example, it can be fixed connection, removable connection, or integrated connection. It can be mechanical connection, electrical connection or mutual communication. It can be directly connected or indirectly connected through an intermediate medium. It can be a connection within two elements or the interaction relationship between two elements.

In the present disclosure, unless otherwise expressly provided and limited, the first feature "above" or "below" of the second feature may include direct contact between the first and second features, or the first and second features may not be in direct contact, but through another feature contact between them. Moreover, the first feature is "above", "above" and "above" of the second feature, including the first feature being directly above and obliquely above the second feature, or only indicating that the horizontal height of the first feature is higher than the second feature. The first feature is "below", "below" and "below" of the second feature, including the first feature being directly above and obliquely above the second feature, or only indicating that the horizontal height of the first feature is less than that of the second feature.

The following disclosure provides many different embodiments or examples to implement different structures of the present application. In order to simplify the disclosure of the present application, the components and settings of specific examples are described below. Of course, they are merely examples and are not intended to limit the present application. In addition, the present application may repeat reference numbers and reference letters in different examples for the purpose of simplification and clarity, which itself does not indicate the relationship between the various embodiments and settings discussed.

FIG. 1 illustrates a detecting device 10 in accordance with an embodiment of the present disclosure.

The detecting device 10 is used to detect and analyze a surface of a product 20. The product 20 has a square structure, the length direction of the product 20 arranged on the detecting device 10 is defined as the first direction, the width direction of the product 20 is defined as the second direction, and the second direction is perpendicular to the first direction, the product 20 can be an electronic device, such as mobile phone and tablet.

Figure 2:
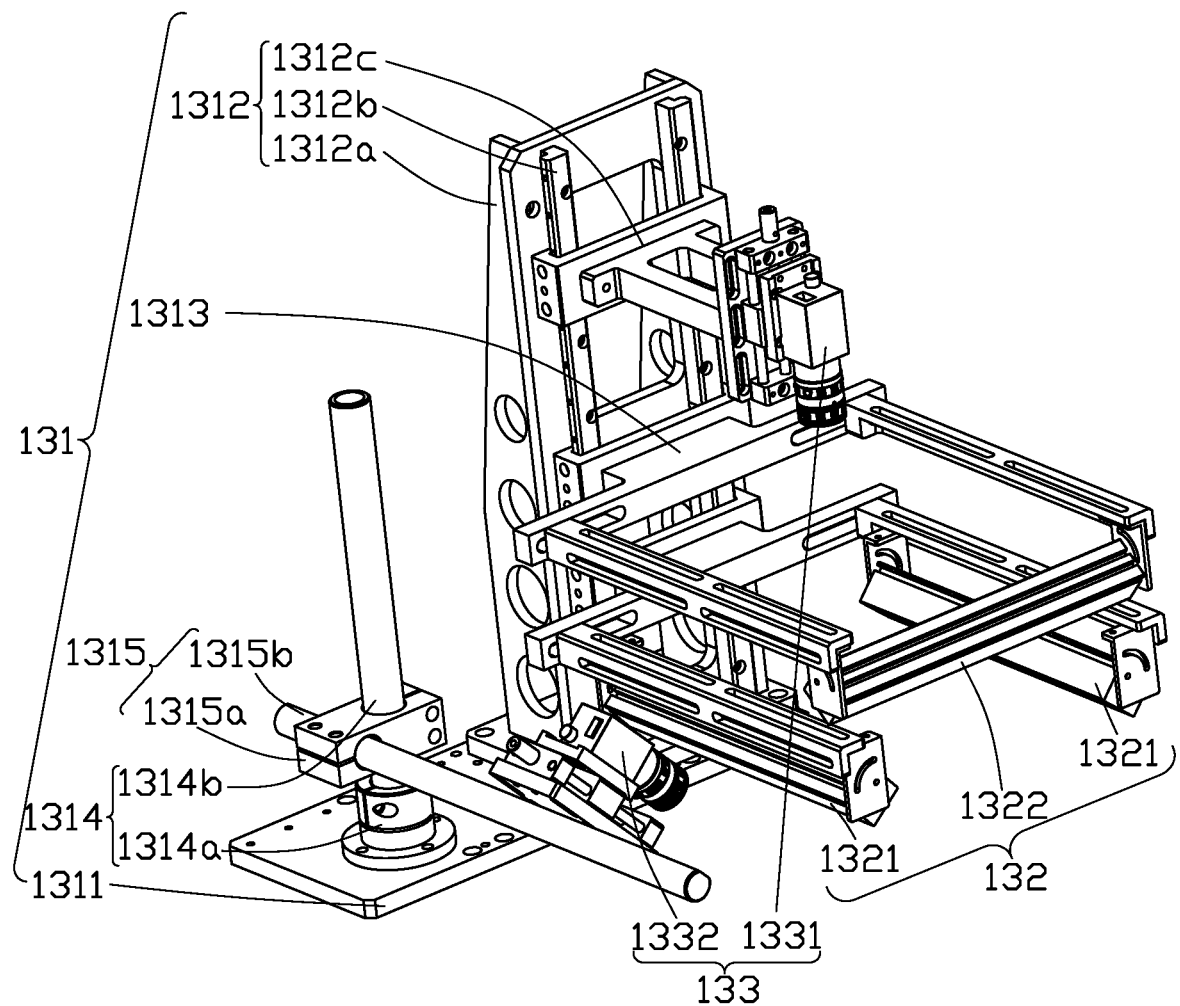
FIG. 2 is a schematic diagram of a detecting mechanism according to an embodiment of the present disclosure.

Referring to FIG. 2, the detecting device 10 includes a transmitting mechanism 11, a supporting mechanism 12, a detecting mechanism 13, and a processor 14. The transmitting mechanism 11 is used to carry and transmit the product 20. The upward side of the product 20 is the front 21 of the product 20, and the transmitting mechanism 11 is arranged on the supporting mechanism 12. The detecting mechanism 13 includes a detecting frame 131, a light source assembly 132 arranged on the detecting frame 131, and an camera assembly 133 arranged on the detecting frame 131. The detecting frame 131 is arranged on the supporting mechanism 12 to move in the first direction and the second direction. The light source assembly 132 includes two red light strips 1321 and one white light strip 1322. The included angle between the light emitted by the two red light strips 1321 and the front 21 of the product 20 is an acute angle. The included angle between the white light strip 1322 and the front 21 of the product 20 is an acute angle, and the two red light strips 1321 are arranged along the first direction. The white light strip 1322 is arranged along the second direction. The camera assembly 133 includes a first camera module 1331 and a second camera module 1332. The image taking direction of the first camera module 1331 is perpendicular to the front 21 of the product 20, and the first camera module 1331 is used to obtain a first image under the light of the red light strip 1321. The included angle between the image taking direction of the second camera module 1332 and the front 21 of the product 20 is an acute angle, which is used to obtain the second image under the light of the white light strip 1322. The processor 14 is connected to the first camera module 1331 and the second camera module 1332 for processing the first image and the second image to obtain the analysis of the front 21 of the product 20. Both the first camera module 1331 and the second camera module 1332 can be area array cameras.

The detecting device 10 uses the first camera module 1331 to obtain the first image of the front 21 of the product 20 under the red light strip 1321, and the detecting device 10 also uses the second camera module 1332 to obtain the second image of the front 21 of the product 20 under the white light strip 1322. The detecting device 10 processes the obtained first image and the second image through the processor 14. Therefore, the detecting device 10 uses the first camera module 1331 and the second camera module 1332 to cooperate with two red light strips 1321 and one white light strip 1322, to obtain the image of the front 21 of the product 20, and uses the processor 14 to automatically identify defects such as air flow mark, grinding mark, edge collapse, and scratch on the front 21 of the product 20, which improves the accuracy of analysis and saves labor cost.

The above processing of the first image and the second image obtained by the processor 14 refers to comparing the obtained first image and the second image with the standard image prestored in the processor 14, by using the discrimination model in the processor to determine defects such as air flow mark, grinding mark, edge collapse, scratch, and so on in the first image and the second image. The formation process of the discrimination model is roughly as follows: train the computer to learn the air flow mark, grinding mark, edge collapse, scratch, and other defects on the front 21 of the product 20 (for example, features showing defects in an image), establish a learning model for the learned content, and form the learned image information into a standard image library stored in the processor 14, and a discrimination model for determining positive defects of products, established according to the standard image database.

In one embodiment, the processor 14 may be a microcomputer. In another embodiment, the processor 14 may be a microcomputer with the functions of calculating and storing images, and the processor 14 may be connected to external devices to cooperate with the detecting device 10 to complete the corresponding work.

In one embodiment, the supporting mechanism 12 includes a supporting platform 121, a supporting frame 122, and a moving member 123. The transmitting mechanism 11 is arranged on the supporting platform 121. The supporting frame 122 is connected to the supporting platform 121, and the supporting frame 122 includes two gantry carriages 1221 arranged symmetrically. The two gantry carriages 1221 extend along the first direction, and each gantry carriage 1221 is provided with a first guiding rail 1222. The moving member 123 is slidably connected with the first guiding rail 1222, the moving member 123 is provided with a second guiding rail 1231 arranged along the second direction, and the detecting frame 131 is slidably connected with the second guiding rail 1231.

The supporting platform 121 can be connected to an external device to cooperate with the detecting device 10 to complete the corresponding operation.

In one embodiment, the transmitting mechanism 11 includes a transmitting bracket 111 and a transmitting belt 112. The transmitting bracket 111 is arranged on the supporting platform 121 and is located between two gantry carriages 1221. After the product 20 is placed on the transmitting belt 112, the length direction of the product 20 is consistent with the transmission direction of the transmitting belt 112. The transmitting bracket 111 and the transmitting belt 112 can be extended on the supporting platform 121 according to the actual needs to adapt to the external device and cooperate with the detecting device 10 to complete the corresponding operation.

In one embodiment, the detecting frame 131 includes a fixing plate 1311, a first detecting rack 1312, a second detecting rack 1313, a base 1314 and an adapting member 1315. The fixing plate 1311 is slidably connected with the second guiding rail 1231. The first detecting rack 1312 includes a first detecting rod 1312a, a detecting track 1312b and an adjusting block 1312c. One end of the first detecting rod 1312a is connected to the fixing plate 1311, the detecting track 1312b is fixedly connected to the first detecting rod 1312a, and the length direction of the detecting track 1312b is arranged along the third direction. One end of the adjusting block 1312c is slidably connected to the detecting track 1312b, and the other end of the adjusting block 1312c is connected to the first camera module 1331, wherein the third direction, the first direction, and the second direction are perpendicular to each other.

The second detecting rack 1313 is slidably connected with the detecting track 1312b in a hollow rectangular structure. Two red light strips 1321 and one white light strip 1322 are arranged on the second detecting rack 1313, and the two red light strips 1321 are symmetrically arranged.

In one embodiment, the base 1314 includes a base body 1314a and a base fixing rod 1314b arranged on the base body 1314a. The base body 1314a is arranged on the fixing plate 1311, and the length direction of the base fixing rod 1314b is consistent with the third direction.

The adapting member 1315 includes an adapting body 1315a and an adapting rod 1315b arranged on the adapting body 1315a. The adapting body 1315a is connected to the base fixing rod 1314b, and the second camera module 1332 is connected to the adapting rod 1315b. The adapting rod 1315b can be rotatably connected with the adapting body 1315a to adjust the image taking direction of the second camera module 1332 located on the adapting rod 1315b. The adapting body 1315a can be movably connected with the base fixing rod 1314b, for example, it can be detachably connected by screws to change the position of the adapting body 1315a in the third direction, and then change the position of the second camera module 1332 in the third direction.

The first direction is the extension direction of the first guiding rail 1222, the X axis in FIG. 1, the second direction is the extension direction of the second guiding rail 1231, the Y axis in FIG. 1, and the third direction is the extension direction of the detecting track 1312*b*, and the Z axis in FIG. 1.

Figure 3:
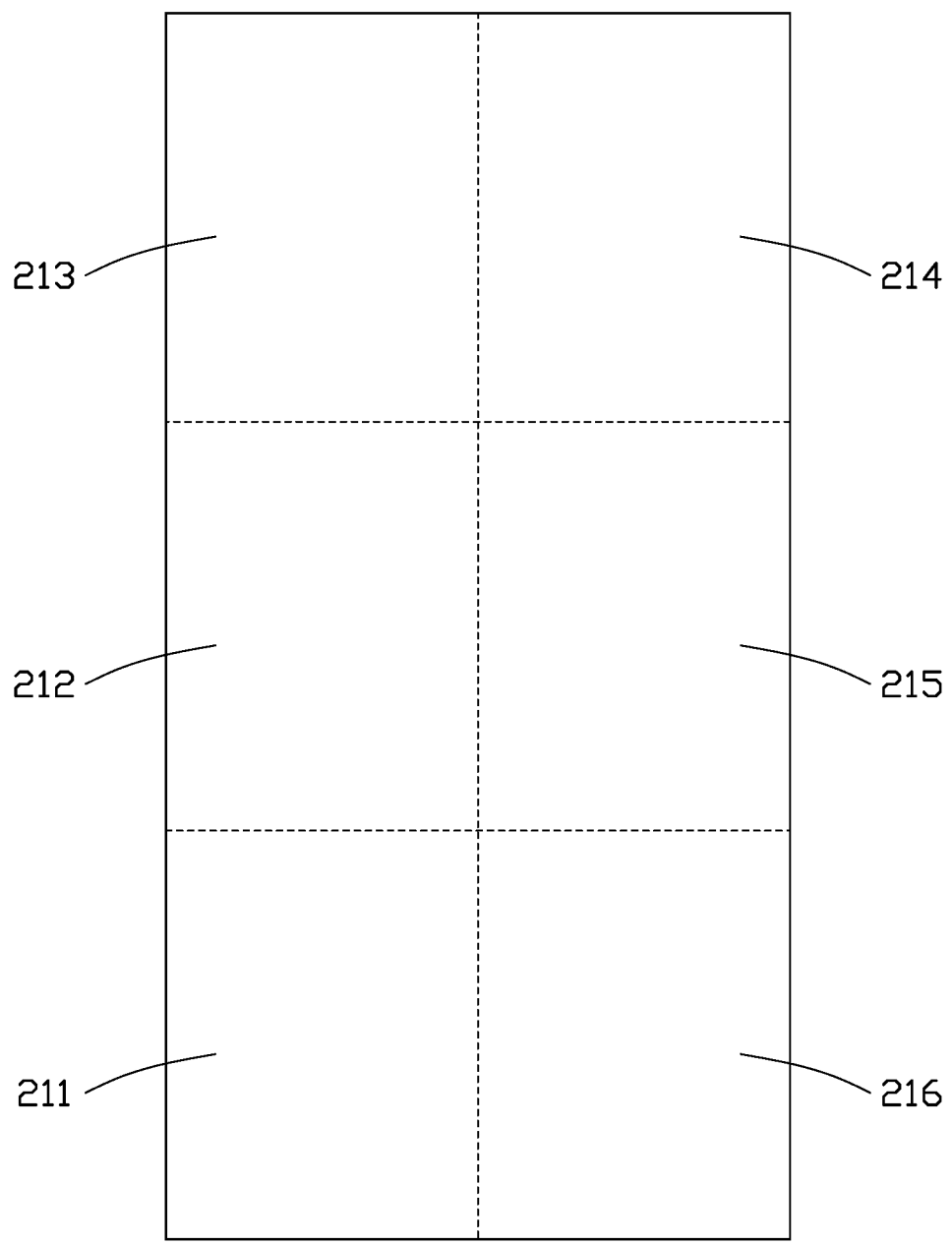
FIG. 3 is a schematic diagram of a division of the front of a product into areas of an embodiment of the present disclosure.

Referring to FIG. 3, when the front 21 of the product 20 is detected by the detecting device 10, the front 21 is divided into a first front 211, a second front 212, a third front 213, a fourth front 214, a fifth front 215, and a sixth front 216 as FIG. 3 shows. The first front 211, the second front 212, and the third front 213 are arranged along the length direction of the product 20, and the first front 211 and the sixth front 216 are arranged along the width direction of the product 20. The areas of the first front 211, the second front 212, the third front 213, the fourth front 214, the fifth front 215 and the sixth front 216 are the same.

In another embodiment, the front 21 can also be divided into other areas.

Figure 4:
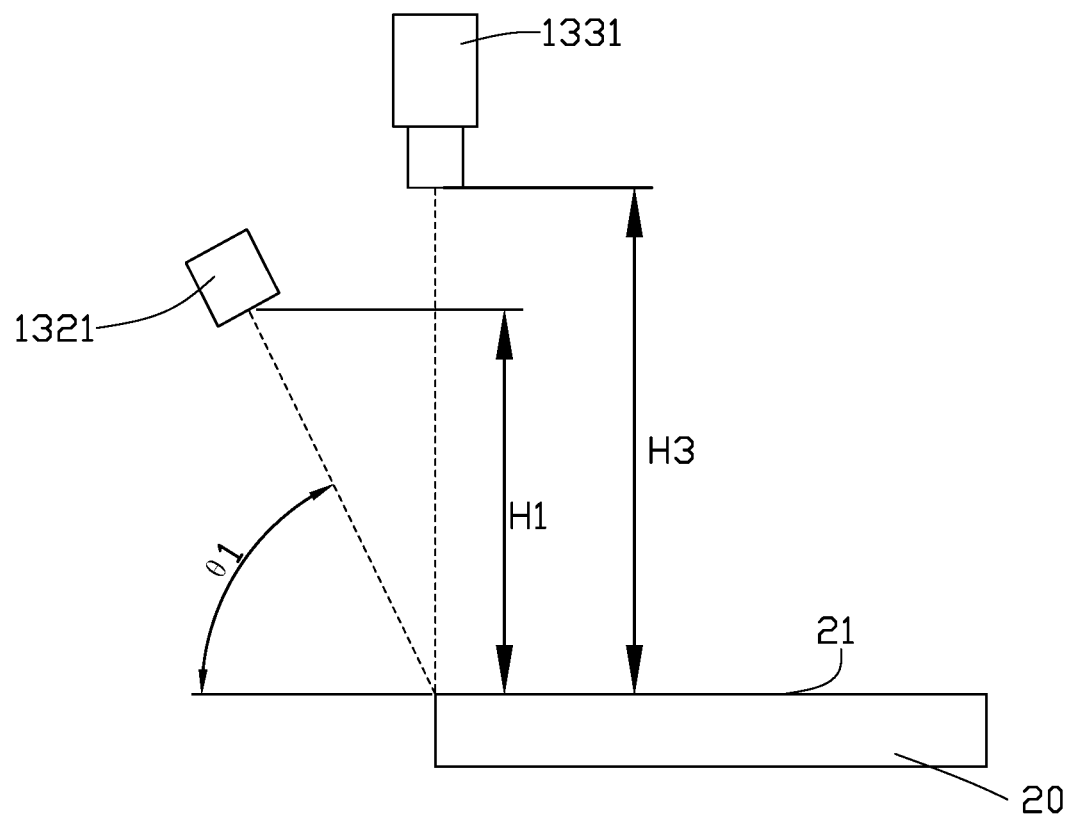
FIG. 4 is a schematic diagram of the first state of a red light strip, a first camera module, and the product, in an embodiment of the present disclosure.
Figure 5:
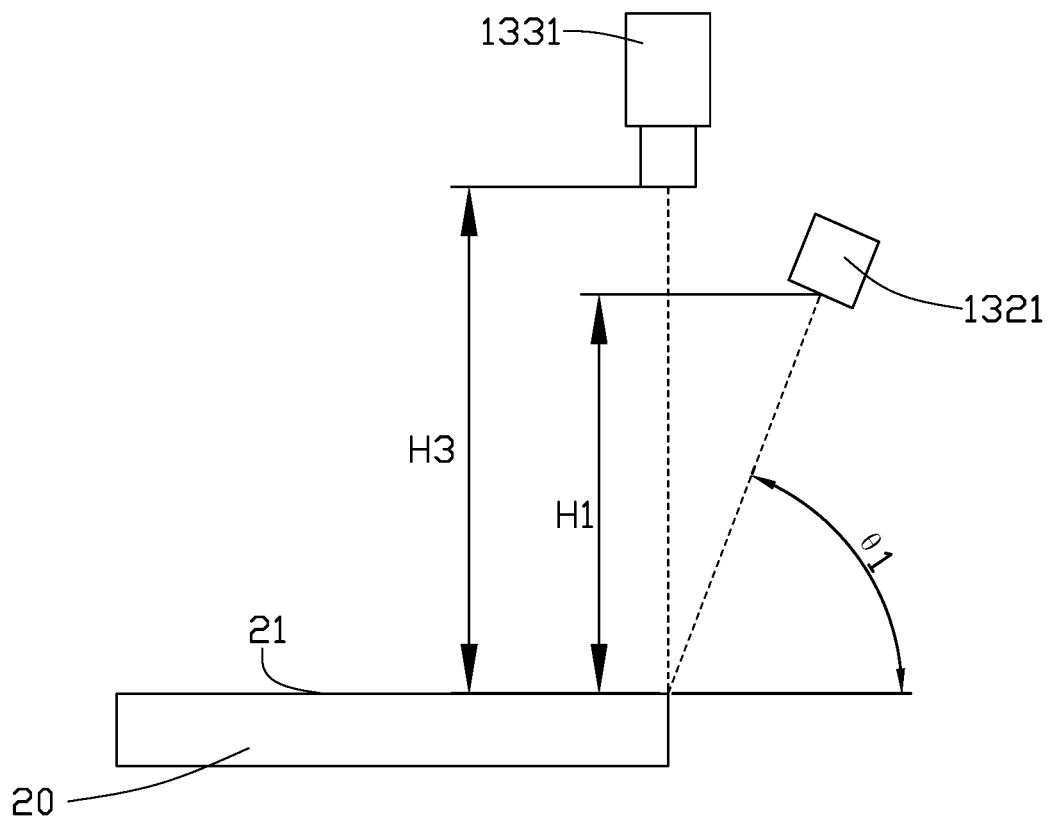
FIG. 5 is a schematic diagram of the first state of a red light strip, a first camera module, and the product, in another embodiment of the present disclosure.

Referring to FIG. 4 and FIG. 5, in one embodiment, the detecting device 10 satisfies the relationship: $30°<\theta1<50°$.

$\theta1$ is the included angle between the light emitted by each red light strip 1321 and the front 21 of the product 20, and $\theta1$ can be 35°, 40° and 45°.

In one embodiment, the detecting device 10 satisfies the relationship $H1=(0.2~0.7)*[(a+b)/2]$.

H1 is the distance from each red light strip 1321 along the third direction to the front 21 of the product 20, a is the length of the product, and B is the width of the product.

In the embodiment, the distance and included angle between the red light strip 1321 in the detecting mechanism 13 and the front 21 of the product 20 are configured to achieve a better image taking effect.

The detecting device 10 satisfies the relationship $H3=(0.5~1.3)*[(a+b)/2]$.

H3 is the distance from the first camera module 1331 along the third direction to the front 21 of the product 20, a is the length of the product 20, and B is the width of the product 20.

In the embodiment, the distance between the first camera module 1331 in the detecting mechanism 13 and the front 21 of the product 20 is configured to achieve a better camera module effect.

Referring to FIG. 3 to FIG. 5, during detection, the moving member 123 is driven to move on the first guiding rail 1222 manually or through power components (such as cylinder or motor), so that the light emitted by a red light strip 1321 covers the first front 211, the second front 212, and the third front 213 respectively. At this time, the first images of the first front 211, the second front 212, and the third front 213 in the front 21 are obtained through the first camera module 1331. The moving member 123 is driven to move on the first guiding rail 1222 manually or through power components (such as cylinder or motor), so that the light emitted by the other red light strip 1321 covers the fourth front 214, the fifth front 215, and the sixth front 216 respectively. At this time, the images of the fourth front 214, the fifth front 215, and the sixth front 216 in the front 21 are obtained respectively through the first camera module 1331.

In this way, the images of the first front 211, the second front 212, the third front 213, the fourth front 214, the fifth front 215, and the sixth front 216 form a first image, and the processor 14 preprocesses the first image so obtained to determine the defects such as edge collapse, and scratch in the front 21.

In another embodiment, the order in which the images of the first front 211, the second front 212, the third front 213, the fourth front 214, the fifth front 215 and the sixth front 216 are obtained by using the first camera module 1331 and the second camera module 1332 can be changed.

Referring to FIG. 5, in one embodiment, the detecting device 10 satisfies the relationship: $\theta2<\theta3$.

$\theta2$ is the included angle between the image taking direction of the second camera module 1332 and the front 21 of the product 20, and $\theta3$ is the included angle between the light emitted by the white light strip 1322 and the front 21 of the product 20.

In one embodiment, the detecting device 10 satisfies the relationship: $30°<\theta2<60°$.

$\theta2$ is the included angle between the image taking direction of the second camera module 1332 and the front 21 of the product 20, and $\theta2$ can be 40° or 50°.

In the embodiment, the distance between the second camera module 1332 in the detecting mechanism 13 and the front 21 of the product 20, and the included angle are configured to achieve a better camera module effect.

In one embodiment, the detecting device 10 satisfies the relationship: $30°<\theta3<50°$.

$\theta3$ is the included angle between the light emitted by the white light strip 1322 and the front 21 of the product 20, and $\theta3$ can be 40° or 45°.

Figure 6:
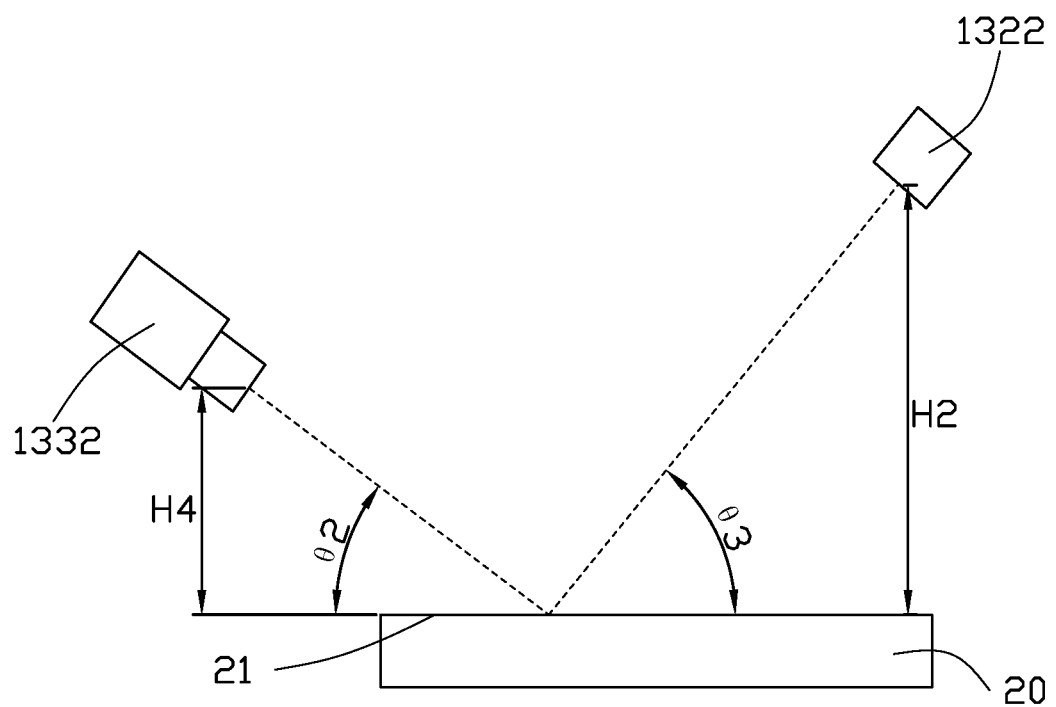
FIG. 6 is a schematic diagram of the first state of a white light strip, a second camera module, and the product, in an embodiment of the present disclosure.

Referring to FIG. 6, in one embodiment, the detecting device 10 satisfies the relationship $H2=(0.4~0.8)*[(a+b)/2]$.

H2 is the distance from each white light strip 1322 along the third direction to the front 21 of the product 20, a is the length of the product 20, and b is the width of the product 20.

In the embodiment, the distance between the white light strip 1322 in the detecting mechanism 13 and the front 21 of the product 20 and the included angle are configured to achieve a better image taking effect.

In one embodiment, the detecting device 10 satisfies the relationship $H4=(0.7~1.7)*[(a+b)/2]$.

H4 is the distance from the second camera module 1332 along the third direction to the front 21 of the product 20, a is the length of the product 20, and b is the width of the product 20.

In the embodiment, the distance between the second camera module 1332 in the detecting mechanism 13 and the front 21 of the product 20 is configured to achieve a better camera module effect.

Figure 7:
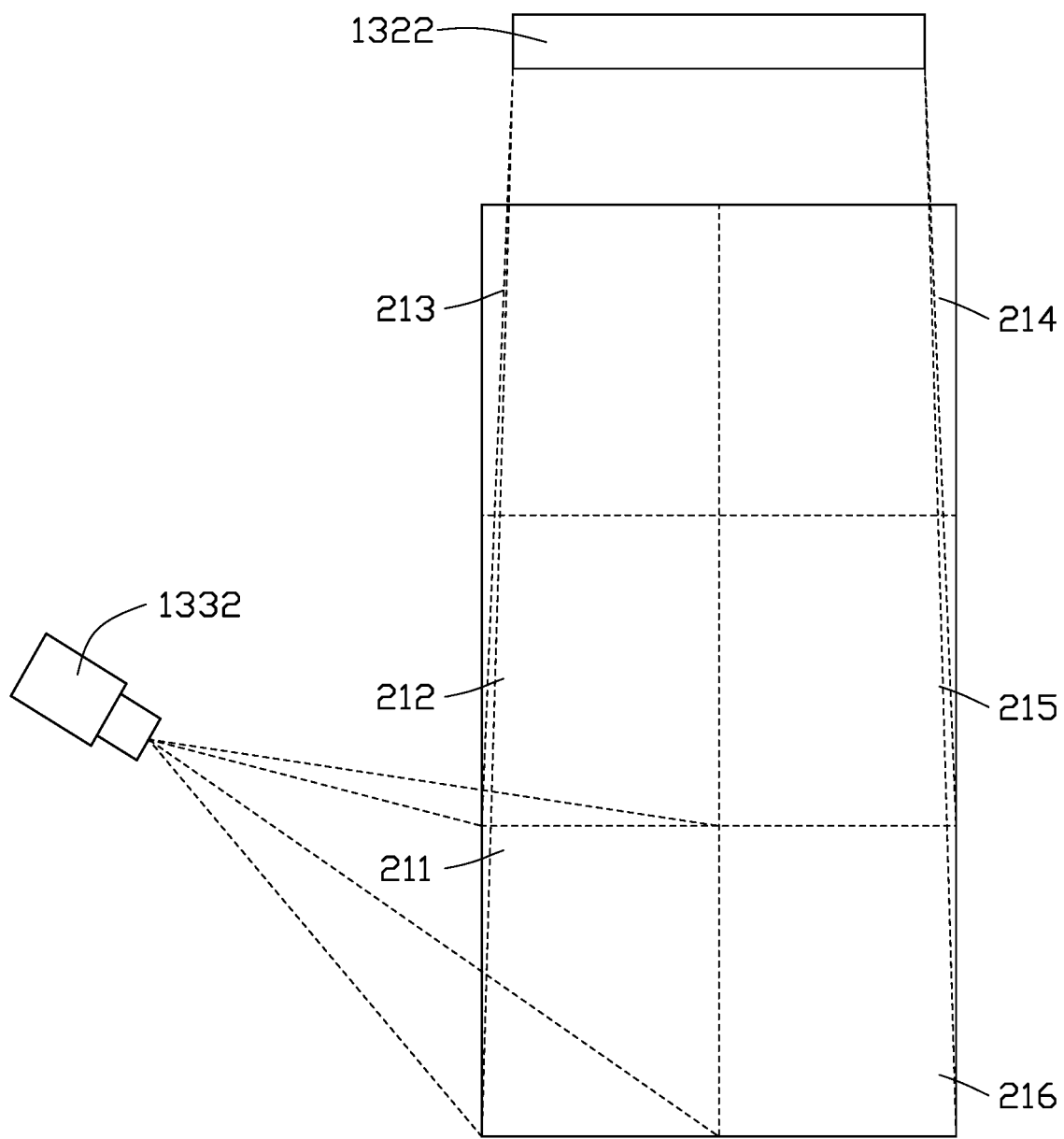
FIG. 7 is a schematic diagram of the first state of a white light strip, a second camera module, and the product, in another embodiment of the present disclosure.

Referring to FIG. 7, during detection, the moving member 123 is driven to move in the positive direction on the first guiding rail 1222 manually or through power components (such as cylinder or motor), so that the light emitted by the white light strip 1322 covers the first front 211, the second front 212, and the third front 213 respectively. The first detecting rack 1312 is driven manually or through power components (such as cylinder or motor) to drive the fixing plate 1311 to slide on the second guiding rail 1231, so that the light emitted by the white light strip 1322 is transferred from the third front 213 to the fourth front 214. Manually or through power components (such as cylinder or motor) the moving member 123 is moved in the opposite direction on the first guiding rail 1222, so that the light emitted by the white light strip 1322 covers the fifth front 215 and the sixth front 216 respectively. In this process, images of the first front 211, the second front 212, the third front 213, the fourth front 214, the fifth front 215, and the sixth front 216 in the front 21 are obtained by using the second camera module 1332.

In this way, the obtained images of the first front 211, the second front 212, the third front 213, the fourth front 214, the fifth front 215, and the sixth front 216 form a second image, and the processor 14 processes the obtained second image to determine the presence of defects such as grinding marks and air flow marks on the front 21.

Those of ordinary skill in the art should realize that the above embodiments are only used to illustrate the present disclosure, but not to limit the present disclosure. As long as they are within the essential spirit of the present disclosure, the above embodiments are appropriately made. Changes and changes fall within the scope of protection of the present disclosure.

What is claimed is:

1. A detecting device for detecting a surface of a product, the detecting device comprising:
   a supporting mechanism;
   a transmitting mechanism carrying and transmitting the product; wherein the transmitting mechanism is arranged on the supporting mechanism, and an upward side of the product is a front of the product;
   a detecting mechanism comprising a detecting frame, a light source assembly, and an camera assembly, wherein the light source assembly is arranged on the detecting frame, and the camera assembly is arranged on the detecting frame; and wherein length direction of the product arranged on the detecting device is defined as a first direction, width direction of the product is defined as a second direction, and the second direction is perpendicular to the first direction; wherein the detecting frame is arranged on the supporting mechanism to move along the first direction and the second direction; the light source assembly comprises two red light strips and one white light strip, an included angle between light emitted by the two red light strips and the front of the product is an acute angle, and the included angle between the white light strip and the front of the product is an acute angle, the two red light strips are arranged along the first direction, and the white light strip is arranged along the second direction; wherein the camera assembly comprises a first camera module and a second camera module, and an image capturing direction of the first camera module is perpendicular to the front of the product, the first camera module obtains a first image under the light of the red light strip; an included angle between an image capturing direction of the second camera module and the front of the product is an acute angle, the second camera module obtains a second image under the light of the white light strip; and
   a processor connecting to each of the first camera module and the second camera module, and preprocessing the first image and the second image to obtain a detection result of the front of the product.

2. The detecting device of claim 1, wherein:
   the supporting mechanism comprises a supporting platform, a supporting frame, and a moving member, the transmitting mechanism is arranged on the supporting platform, the supporting frame is connected to the supporting platform, the supporting frame comprises a first guiding rail, and the first guiding rail is parallel to the first direction; the moving member is connected to the first guiding rail, the moving member comprises a second guiding rail, the second guiding rail is parallel to the second direction, the detecting frame is connecting to the second guiding rail.

3. The detecting device of claim 1, wherein:
   the detecting device satisfies a relationship of 30°<θ1<50°;
   wherein θ1 is the included angle between the light emitted by each of the two red light strips and the front of the product.

4. The detecting device of claim 1, wherein:
   the detecting device satisfies a relationship of θ2<θ3;
   wherein θ2 is the included angle between the image taking direction of the second camera module and the front of the product, θ3 is the included angle between the light emitted by the white light strip and the front of the product.

5. The detecting device of claim 4, wherein:
   the detecting device satisfies the relationship of 30°<θ2<60°
   wherein θ2 is the included angle between the image taking direction of the second camera module and the front of the product.

6. The detecting device of claim 5, wherein:
   the detecting device satisfies the relationship of 30°<θ3<50°
   wherein θ3 is the included angle between the light emitted by the white light strip and the front of the product.

7. The detecting device of claim 1, wherein:
   the detecting device satisfies a relationship of H1=(0.2~0.7)*[(a+b)/2];
   wherein H1 is a distance from each of the two red light strips in the third direction to the front of the product, a is a length of the product, and b is a width of the product.

8. The detecting device of claim 7, wherein:
   the detecting device satisfies the relationship of H2=(0.4~0.8)*[(a+b)/2];
   wherein H2 is a distance from each of the white light strip in the third direction to the front of the product, a is the length of the product, and b is the width of the product.

9. The detecting device of claim 8, wherein:
   the detecting device satisfies the relationship of H3=(0.5~1.3)*[(a+b)/2];
   wherein H3 is a distance from the first camera module in the third direction to the front of the product, a is the length of the product, and b is the width of the product.

10. The detecting device of claim 9, wherein:
    the detecting device satisfies the relationship of H4=(0.7~1.7)*[(a+b)/2];
    wherein H4 is a distance from the second camera module in the third direction to the front of the product, a is the length of the product, and b is the width of the product.

11. A detecting device of detecting a surface of a product, and the detecting device comprising:
    a supporting mechanism;
    a transmitting mechanism carrying and transmitting the product; wherein the transmitting mechanism is arranged on the supporting mechanism, and an upward side of the product is front;
    a detecting mechanism comprising a detecting frame, a light source assembly, and an camera assembly, wherein the light source assembly is arranged on the detecting frame, and the camera assembly is arranged on the detecting frame; and wherein length direction of the product arranged on the detecting device is defined as a first direction, width direction of the product is defined as a second direction, and the second direction is perpendicular to the first direction; wherein the detecting frame is arranged on the supporting mechanism to move along the first direction and the second direction; the light source assembly comprises two red light strips and one white light strip, an included angle between light emitted by the two red light strips and the front of the product is an acute angle, and the included angle between the white light strip and the front of the product is an acute angle, the two red light strips are arranged along the first direction, and the white light strip is arranged along the second direction; wherein the camera assembly comprises a first camera module and a second camera module, and an image capturing direction of the first camera module is perpendicular to the front of the product, the first camera module obtains a first image under the light of the red light strip; an included angle between an image capturing direction of the second camera module and the front of the product is an acute angle, the second camera module obtains the second image under the light of the white light strip; and a processor connecting to each of the first camera module and the second camera module, and preprocessing the first image and the second image to obtain a detection result of the front of the product;

wherein the supporting mechanism comprises a supporting platform, a supporting frame, and a moving member, the transmitting mechanism is arranged on the supporting platform, the supporting frame is connected to the supporting platform, the supporting frame comprises a first guiding rail, and the first guiding rail is parallel to the first direction; the moving member is connected to the first guiding rail, the moving member comprises a second guiding rail, the second guiding rail is parallel to the second direction, the detecting frame is connecting to the second guiding rail.

12. The detecting device of claim 11, wherein:
the detecting device satisfies a relationship of $30°<\theta1<50°$;
wherein $\theta1$ is the included angle between the light emitted by each of the two red light strip and the front of the product.

13. The detecting device of claim 11, wherein:
the detecting device satisfies a relationship of $\theta2<\theta3$;
wherein $\theta2$ is the included angle between the image taking direction of the second camera module and the front of the product, $\theta3$ is the included angle between the light emitted by the white light strip and the front of the product.

14. The detecting device of claim 13, wherein:
the detecting device satisfies the relationship of $30°<\theta2<60°$;
wherein $\theta2$ is the included angle between the image taking direction of the second camera module and the front of the product.

15. The detecting device of claim 14, wherein:
the detecting device satisfies the relationship of $30°<\theta3<50°$;
wherein $\theta3$ is the included angle between the light emitted by the white light strip and the front of the product.

16. The detecting device of claim 11, wherein:
the detecting device satisfies a relationship of $H1=(0.2\sim0.7)*[(a+b)/2]$;
wherein $H1$ is a distance from each of the two red light strips in the third direction to the front of the product, a is a length of the product, and b is a width of the product.

17. The detecting device of claim 16, wherein:
the detecting device satisfies the relationship of $H2=(0.4\sim0.8)*[(a+b)/2]$;
wherein $H2$ is a distance from each of the white light strip in the third direction to the front of the product, a is the length of the product, and b is the width of the product.

18. The detecting device of claim 17, wherein:
the detecting device satisfies the relationship of $H3=(0.5\sim1.3)*[(a+b)/2]$;
wherein $H3$ is a distance from the first camera module along the third direction to the front of the product, a is the length of the product, and b is the width of the product.

19. The detecting device of claim 18, wherein:
the detecting device satisfies the relationship of $H4=(0.7\sim1.7)*[(a+b)/2]$;
wherein $H4$ is a distance from the second camera module in the third direction to the front of the product, a is the length of the product, and b is the width of the product.

* * * * *